Oct. 29, 1935.   H. T. HELLMERS ET AL   2,019,048
MANUFACTURE OF VARIEGATED GLASS ARTICLES
Filed Aug. 29, 1933   2 Sheets-Sheet 2
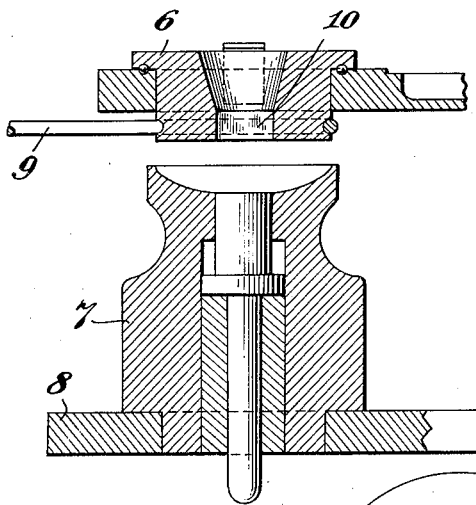
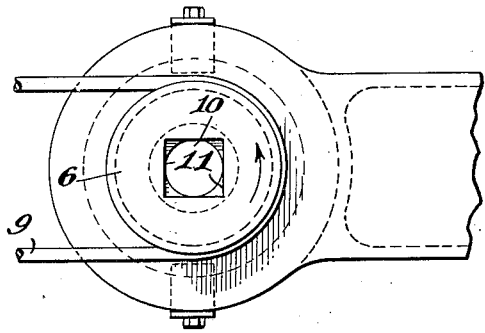
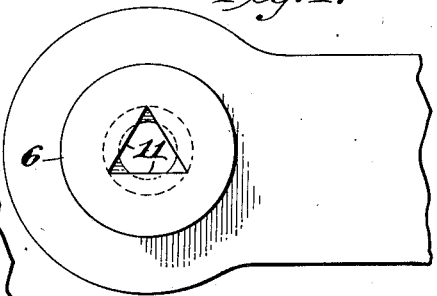
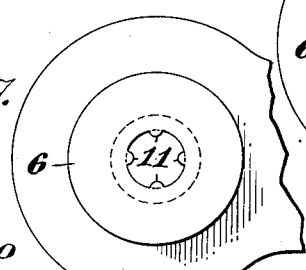
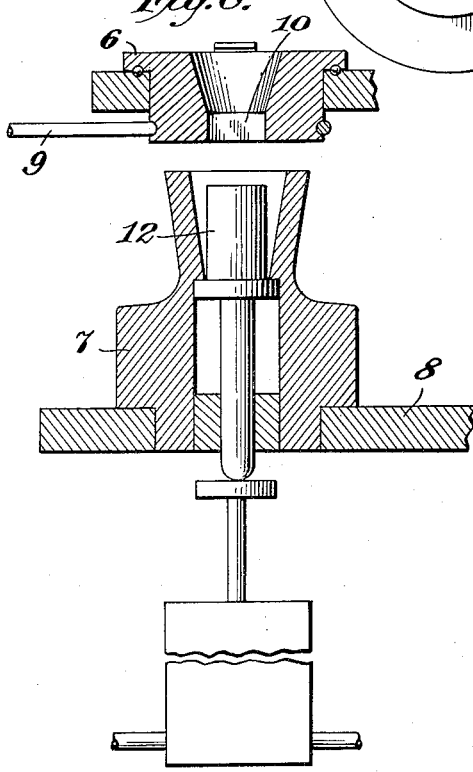
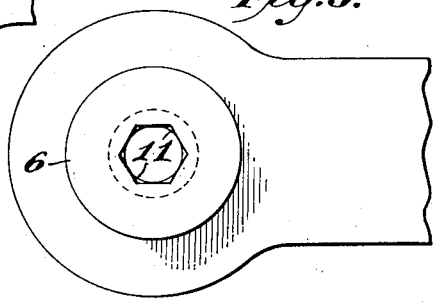
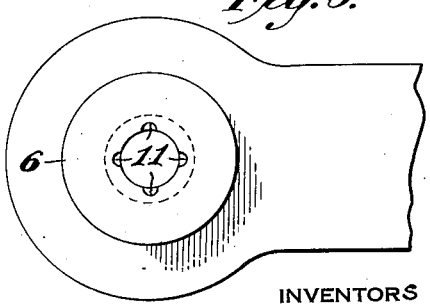
INVENTORS
Henry T. Hellmers and
Robert Harper Donnald
BY
Clarence D. Kerr
THEIR ATTORNEY Patented Oct. 29, 1935

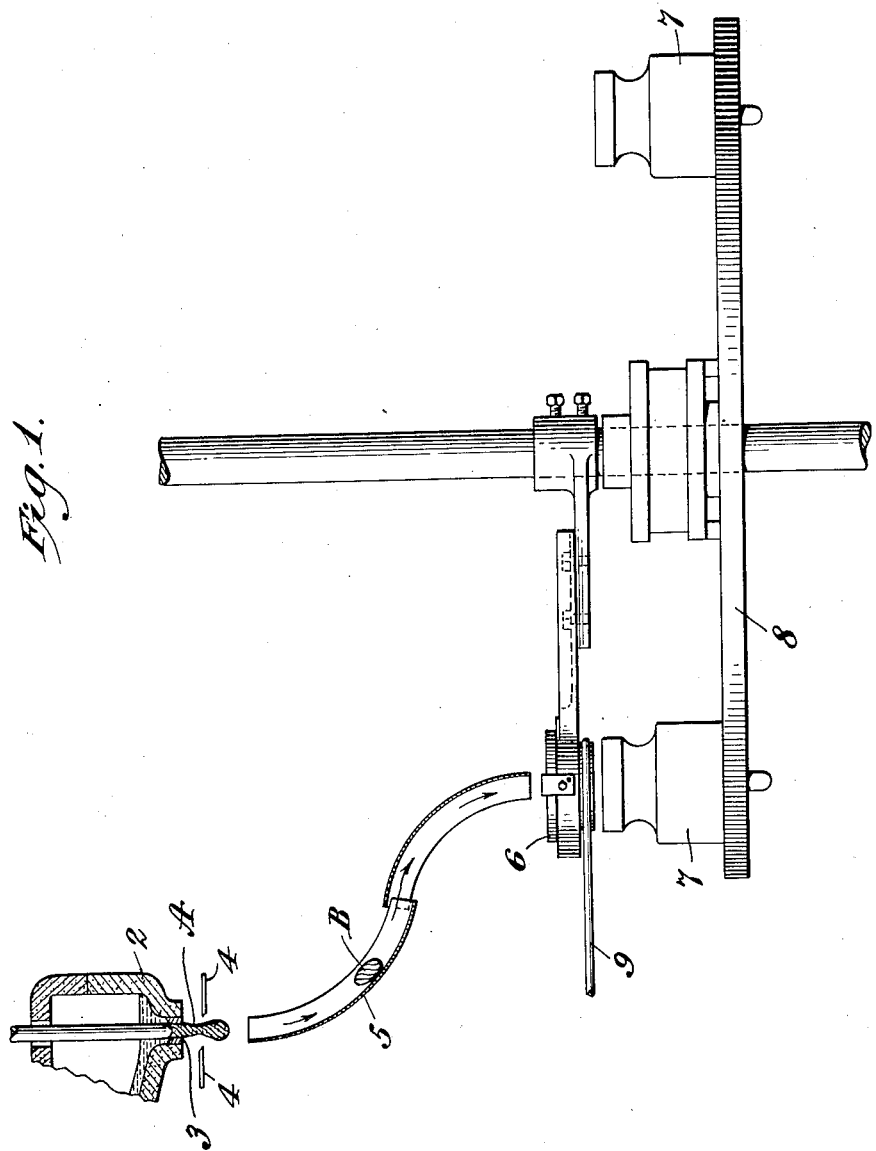

2,019,048

UNITED STATES PATENT OFFICE 2,019,048

MANUFACTURE OF VARIEGATED GLASS ARTICLES

Henry T. Hellmers and Robert Harper Donnald, Clarksburg, W. Va., assignors to The Akro Agate Company, Akron, Ohio, a corporation of Ohio Application August 29, 1933, Serial No. 687,250

5 Claims. (Cl. 49—14)

In the making of articles of variegated glass it is customary to combine streams of different colored molten glass as they flow out of the flow opening or orifice of the furnace, as is exemplified in Freese Patent No. 1,529,947, dated March 17, 1925. The main body of glass, which forms the base color, is usually called the body glass, and the other color or colors of glass combined with it are called the striping glass. As the components of this combined stream, or body of glass, where they join, just before or at the flow opening, are normally distinct and separate, the tendency of the striping glass, after the streams join, is to remain concentrated in one portion or region of the combined stream, usually at one side, and when a charge is cut from the stream this condition will continue until the charge reaches the forming device and is there formed into an article. The article thus made also usually has the striping glass too much concentrated in one general location and frequently the main body of the article has no striping glass in it at all, instead of having, as is desired, the striping glass diffused throughout the body of the article as widely as possible to give it a uniformly variegated appearance. By means of our invention, embodiments of which we will now describe, we are enabled to diffuse and distribute the striping glass widely throughout the body glass in such manner as to produce variegated articles much superior to those heretofore produced on automatic feeding and forming machines.

In the accompanying drawings Fig. 1 shows a section of glass feeder with a forming machine in elevation arranged in operative relation thereto embodying our improvements and suitable for carrying out our invention; Fig. 2 is an enlarged section of the funnel or centering ring for guiding and delivering the charge of glass to the forming machine; Fig. 3 is a bottom view of the funnel of Fig. 2; Figs. 4, 5, 6 and 7 are bottom views of modified forms of funnels or centering rings suitable for use in carrying out our invention; and Fig. 8 shows a section of the funnel and its relation to a relatively deep mold with the lifting valve in elevated position so as to support a charge during the diffusing operation.

Referring to the drawings, 2 indicates the forehearth of a glass furnace in which molten batches of different colored glasses join at or near the flow opening 3 and in a combined stream A flow out of such opening 3. This combined stream A is cut into separate charges by the cutoff knives 4. Each charge B as it is cut off slides down the guide or chute 5 to and through the funnel or centering ring 6 into the mold or forming device 7, which we have shown as positioned on a rotating mold table 8, but which may be of any known character.

As has been stated above, the tendency of the striping glass is to remain concentrated in one locality in the resulting article. For the purpose of breaking up this concentration and diffusing it through the body of the glass we have provided means 9 (which may be a belt or chain drive) for rotating the centering ring 6 and have changed the usual form of the centering ring so that instead of having an annular opening from top to bottom its opening 10 at its bottom end terminates in a form which will grip the charge as the funnel rotates, throw it in a horizontally tangential direction, tear it and thus break up, scatter and diffuse the striping glass through the body of the charge. Then, when the charge drops down into the forming device 7 the striping glass is so distributed through the body glass as to give the resulting article a very finely variegated texture.

The gripping surface 11 in the bottom end 10 of the funnel may be of varying forms. Thus, in Fig. 3 we have shown it in the form of a rectangle; in Fig. 4, in the form of a triangle; in Fig. 5, in the form of a polyangled surface; in Fig. 6, in the form of inward projections; and in Fig. 7 in the form of recesses. The essential feature is to provide a gripping surface 11 which will seize the charge and throw or disrupt it in such a way as to break up and diffuse the striping or different colored glass through the mass of the charge.

Where the articles being made are in the form of cups, jars, deep nappy ware or the like, which require a deep charge, it is desirable to support the charge during the distributing or diffusing operation, as otherwise the charge would be apt to fall through the funnel without being fully operated on. Hence, as is shown in Fig. 8, the bottom lift valve 12 in the mold or forming device 7 may be elevated to support the charge momentarily as it is being operated on by the gripping surfaces 11 of the rotating centering ring 7.

While we have referred to distributing striping glass through a base or body glass it is to be understood that our invention applies equally well to distributing, mixing and diffusing glass of two or more colors in any proportions through and with each other so that the resulting product will have a variegated texture in which the various colors of glass are widely distributed.

The terms and expressions which we have employed are used as terms of description and not of limitation, and we have no intention, in the use of such terms and expressions, of excluding any equivalents of the features shown or described, but recognize that various modifications are possible within the scope of the invention claimed.

What we claim is—

1. In the method of forming articles of variegated glassware the steps which comprise severing charges of molten glass from a body of multi-colored molten glass as such glass emerges from a furnace and thereafter diverting each charge of glass from its gravity path with sufficient violence to break up and distribute glass of one color throughout the charge and then delivering the charge to a forming device.

2. The method of forming articles of variegated glassware which consists in combining molten glassware of different colors in the delivery spout of a furnace, cutting off charges therefrom, conveying such charges in succession to a forming device, and while being so conveyed subjecting such charges to an abrupt and violent change of direction of movement to disrupt the said charge and distribute glass of one color through glass of another color.

3. Apparatus for forming articles of variegated glassware which comprises a rotating guide having an internal gripping surface adapted to divert the charge from its normal gravity path through such guide, the said guide comprising means for disrupting the charge and distributing glass of one color through glass of another color.

4. Apparatus for making variegated glass articles including means for combining molten glass of different colors together, means for severing charges from such combined mass, forming means for such charges and a centering ring for delivering the charges to the forming means, the centering ring having means to disrupt the said charges and distribute the differently colored glasses in the separate charges through each other.

5. Apparatus for making variegated glass articles including means for combining molten glass of different colors together, means for severing charges from such combined mass, forming devices, and a rotating funnel for guiding the charges into successive forming devices, said funnel also comprising means for distributing the differently colored glasses in the separate charges through each other.

HENRY T. HELLMERS.
ROBERT HARPER DONNALD.